US009393980B2

(12) United States Patent
Busser

(10) Patent No.: US 9,393,980 B2
(45) Date of Patent: Jul. 19, 2016

(54) TOW PLATE SHELF DEVICE

(71) Applicant: Monte Busser, Colton, SD (US)

(72) Inventor: Monte Busser, Colton, SD (US)

( * ) Notice: Subject to any disclaimer, the term of this patent is extended or adjusted under 35 U.S.C. 154(b) by 0 days.

(21) Appl. No.: 14/573,909

(22) Filed: Dec. 17, 2014

(65) Prior Publication Data
US 2016/0176428 A1  Jun. 23, 2016

(51) Int. Cl.
*B62B 5/00* (2006.01)
(52) U.S. Cl.
CPC .......................................... *B62B 5/00* (2013.01)
(58) Field of Classification Search
CPC ............ B62B 1/00; B62B 7/02; B65G 57/00; B65D 19/00
See application file for complete search history.

(56) References Cited

U.S. PATENT DOCUMENTS

| | | | | |
|---|---|---|---|---|
| 3,381,937 A * | 5/1968 | Zillman | ..................... | B66F 9/12 254/104 |
| 4,726,602 A * | 2/1988 | Sanders | ..................... | B62B 1/12 211/181.1 |
| 5,415,109 A * | 5/1995 | McBride | ............ | B65D 19/0002 108/57.29 |
| 5,469,999 A | 11/1995 | Phirippidis | | |
| 5,772,889 A * | 6/1998 | Gjerde | ................... | B01D 15/12 210/635 |
| 6,082,755 A * | 7/2000 | Topar | ....................... | B60D 1/00 280/416.1 |
| 6,626,634 B2 * | 9/2003 | Hwang | .................... | B60P 3/055 108/51.11 |
| 6,655,892 B2 * | 12/2003 | Strohfus | ................. | B60P 3/055 414/334 |
| 6,772,889 B2 | 8/2004 | Moceri | | |
| 6,966,574 B1 | 11/2005 | Dahl | | |
| 7,007,614 B2 | 3/2006 | Gaunt et al. | | |
| 7,490,847 B2 | 2/2009 | Dahl | | |
| 7,562,789 B2 * | 7/2009 | Randolph | .......... | A47G 19/2272 220/212.5 |
| 8,152,180 B2 * | 4/2012 | Anspach | ................... | B62B 1/12 280/47.27 |
| 8,226,092 B2 | 7/2012 | Oliver | | |
| 8,251,379 B2 | 8/2012 | Watzke | | |
| 8,475,109 B2 * | 7/2013 | Torrison | .................. | B62B 3/008 280/47.2 |
| 8,696,014 B2 | 4/2014 | Lin et al. | | |
| 8,714,369 B2 | 5/2014 | Lin et al. | | |
| 2006/0182578 A1 * | 8/2006 | Morton | ..................... | B62B 3/04 414/537 |
| 2010/0236188 A1 * | 9/2010 | Campbell | ................. | B62B 1/12 52/745.15 |
| 2013/0181418 A1 * | 7/2013 | Burton | ..................... | B62B 1/12 280/47.19 |

FOREIGN PATENT DOCUMENTS

JP    2001245732    9/2001

* cited by examiner

Primary Examiner — John Walters
Assistant Examiner — James Triggs

(57) ABSTRACT

A tow plate shelf device supplements a tow plate of an existing hand cart with a shelf increasing the lateral width of the two plate of the hand cart. The device includes a base shelf and a slot extending into a first longitudinal side of the base shelf. The base shelf is configured for coupling to a tow plate of a hand cart by insertion of the tow plate into the slot.

10 Claims, 5 Drawing Sheets

TOW PLATE SHELF DEVICE

BACKGROUND OF THE DISCLOSURE

Field of the Disclosure

The disclosure relates to shelf devices and more particularly pertains to a new shelf device for supplementing a tow plate of an existing hand cart with a shelf increasing the lateral width of the tow plate of the hand cart.

SUMMARY OF THE DISCLOSURE

An embodiment of the disclosure meets the needs presented above by generally comprising a base shelf and a slot extending into a first longitudinal side of the base shelf. The base shelf is configured for coupling to a tow plate of a hand cart by insertion of the tow plate into the slot.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
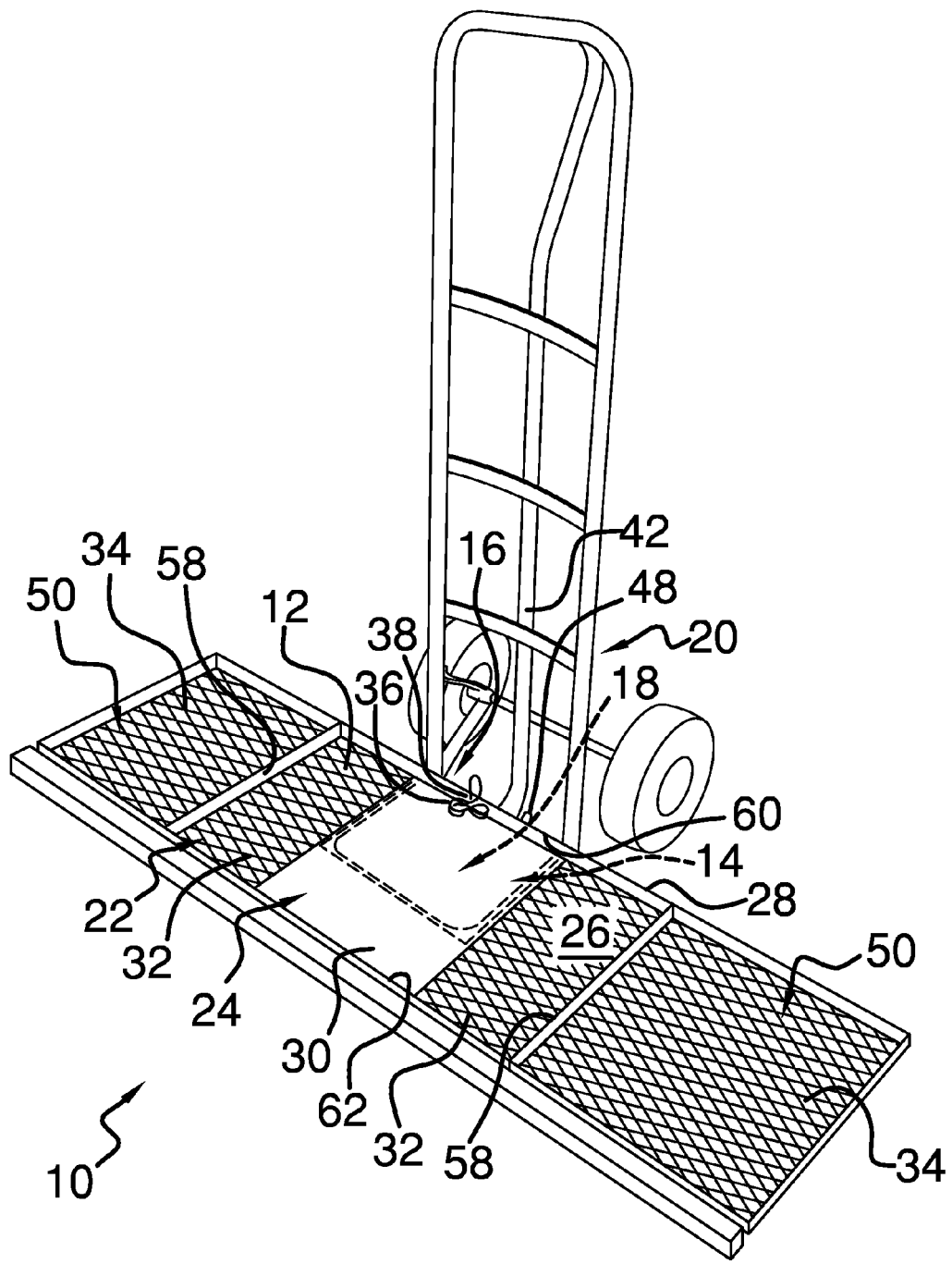
FIG. 1 is a top front side perspective view of a tow plate shelf device according to an embodiment of the disclosure.
Figure 2:
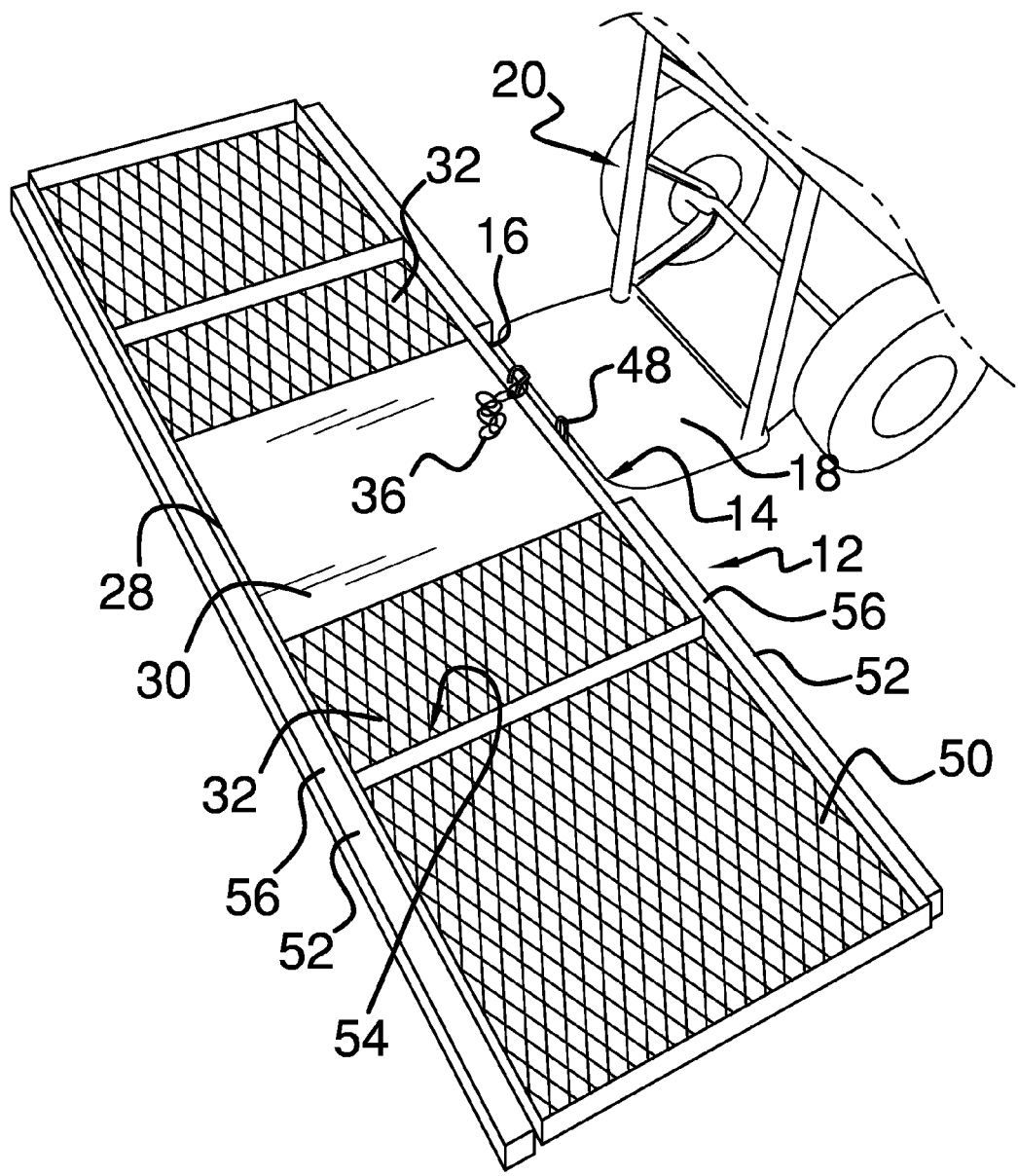
FIG. 2 is a partially exploded top front side perspective view of an embodiment of the disclosure.
Figure 3:
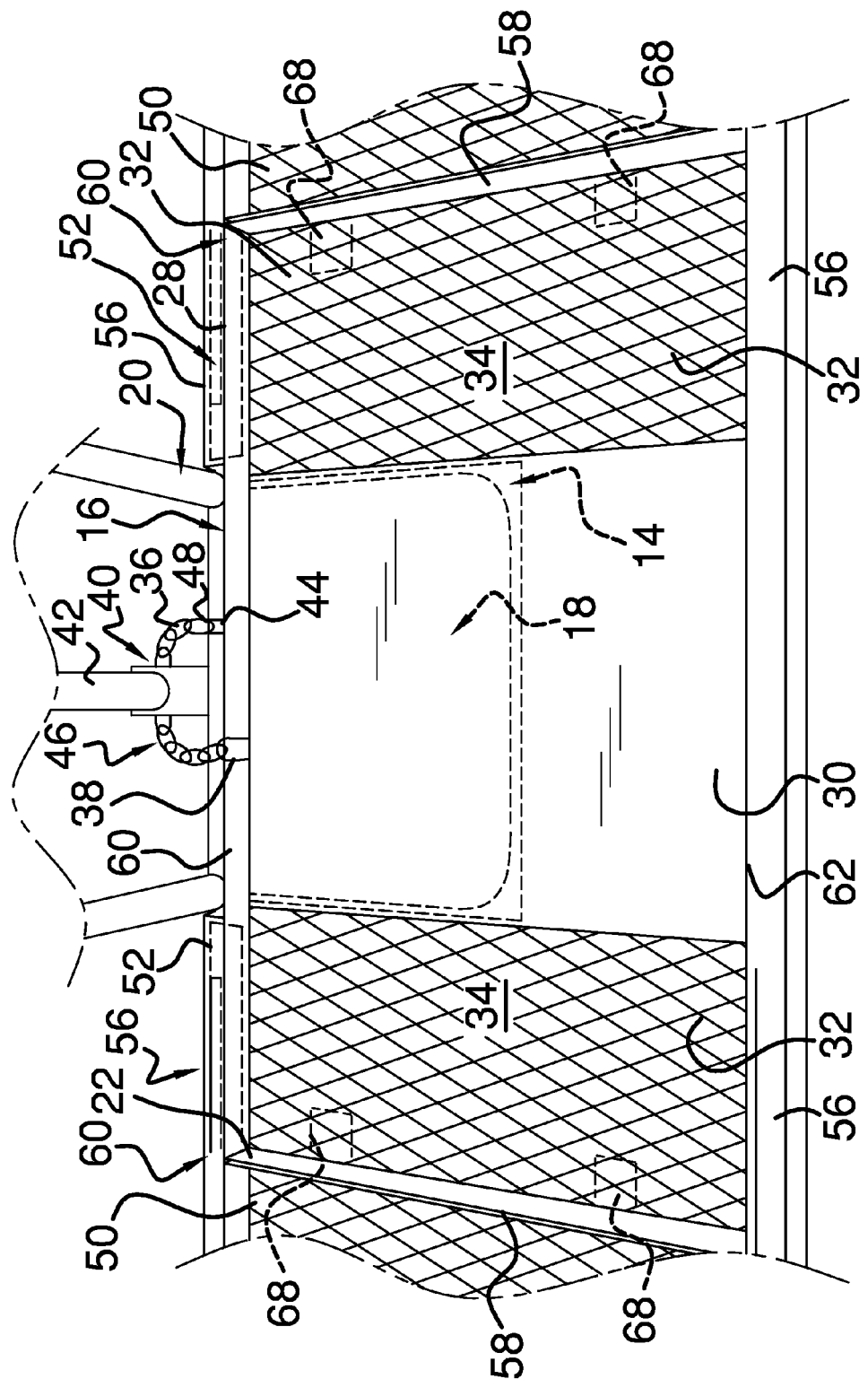
FIG. 3 is a top front perspective view of an embodiment of the disclosure.
Figure 4:
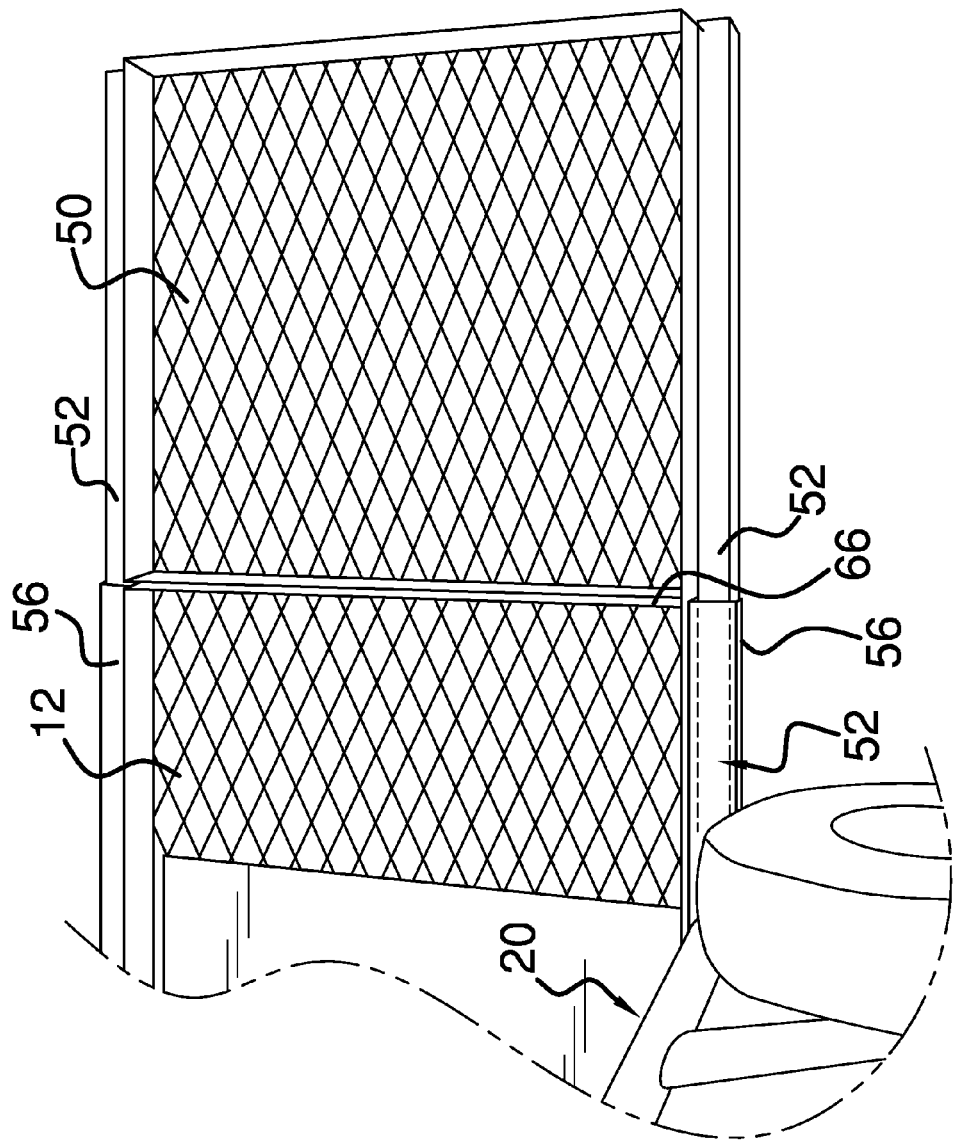
FIG. 4 is a partial top rear perspective view of an embodiment of the disclosure.
Figure 5:
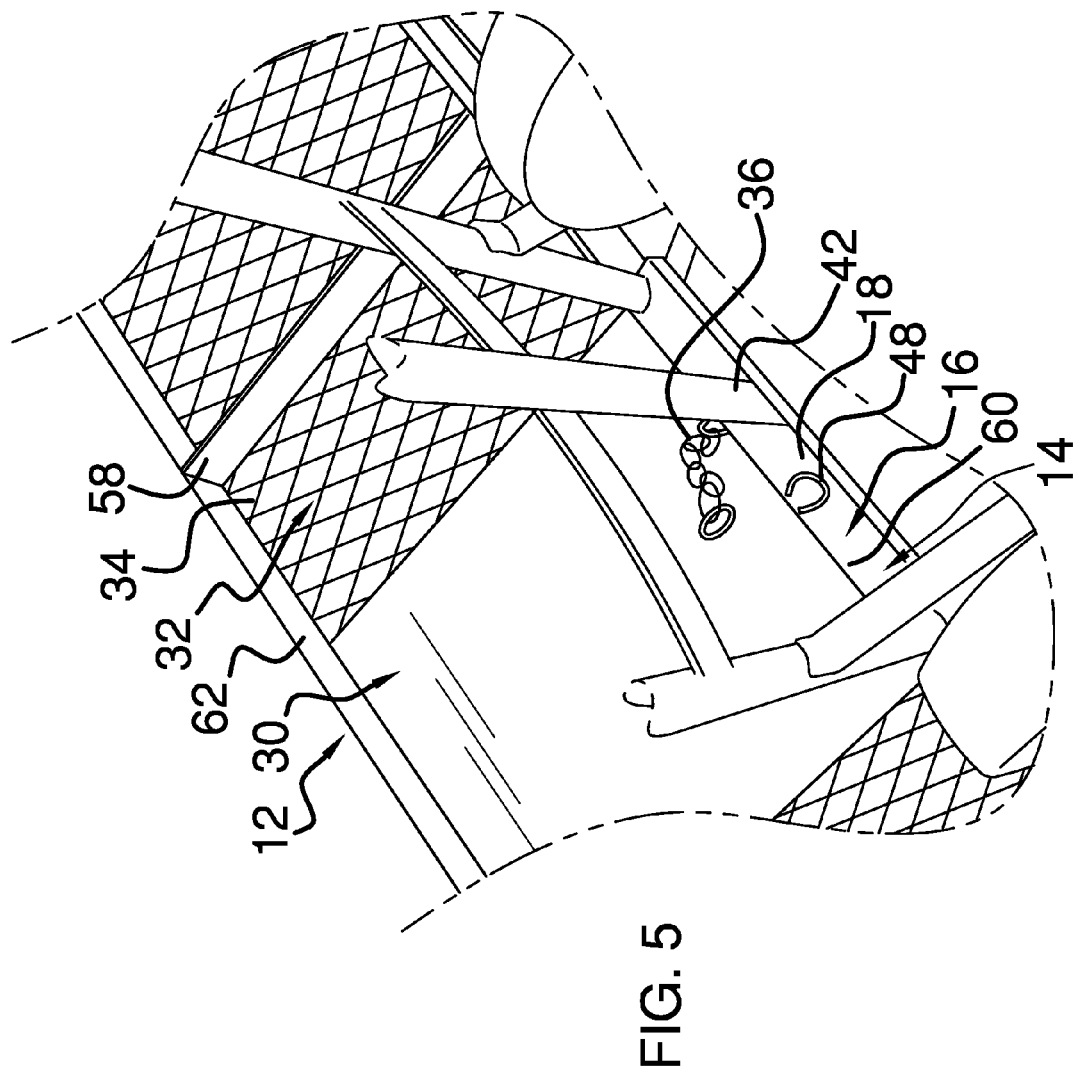
FIG. 5 is a partial top rear side perspective view of an embodiment of the disclosure.

With reference now to the drawings, and in particular to FIGS. 1 through 5 thereof, a new shelf device embodying the principles and concepts of an embodiment of the disclosure and generally designated by the reference numeral 10 will be described.

As best illustrated in FIGS. 1 through 5, the tow plate shelf device 10 generally comprises a base shelf 12 and a slot 14 extending into a first longitudinal side 16 of the base shelf 12. Thus, the base shelf 12 is configured for coupling to a tow plate 18 of a hand cart 20 by insertion of the tow plate 18 into the slot 14. A base frame 22 has a pair of end edges 58, a first longitudinal edge 60, and a second longitudinal edge 62. The slot 14 extends through the first longitudinal edge 60 of the base frame 14. The slot 14 may have an open bottom or may define an opening into an interior space shaped to receive the tow plate 18. The slot 14 has a width substantially similar to a width of the tow plate 18. Lateral edges defining the slot 14 may abut the tow plate 18 to inhibit lateral movement of the tow plate 18 relative to the base shelf 12.

A deck 24 is coupled to the base frame 22. The deck 24 is coextensive with the base frame 22 and the base frame 22 extends upwardly relative to an upper surface 26 of the deck 24 wherein the base frame 22 defines a lip 28 extending around the deck 24. A medial section 30 of the deck 24 is solid and may be constructed of a metal plate or the like. Outer sections 32 of the deck 24 may be constructed of a perforated screen 34.

A tether 36 has a first end 38 coupled to the base shelf 12. The tether 36 is extendable from the first longitudinal side 16 of the base shelf 12. The tether 36 is securable to the base shelf 12 forming a loop 40 such that the tether 36 is configured for positioning the loop 40 around an upright 42 of the hand cart 20 wherein the base shelf 12 is inhibited from sliding off of the tow plate 18 of the hand cart 20. The tether 36 has a looped end 44 and may comprise a chain 46. A hook 48 is coupled to the base shelf 12 and may extend rearwardly away from the deck 24 from the first longitudinal edge of the base frame 22. The looped end 44 is engageable to the hook 48 wherein the tether 36 forms the loop 40 when the looped end 44 receives the hook 48 therethrough.

An auxiliary shelf 50 is provided. Each of a pair of rails 52 is coupled to and extends from the auxiliary shelf 50. Each of the rails 52 extends outwardly from an end side 54 of the auxiliary shelf 50. Each of a pair of receivers 56 is coupled to and extends laterally into the base shelf 12 relative to the end edges 60 of the base frame 22. Each of the rails 52 is insertable into an associated one of the receivers 56 wherein the auxiliary shelf 50 is coupled to the base shelf 12. Each of the receivers 56 extends inwardly relative to an end side 66 of the base shelf 12 wherein the auxiliary shelf 50 is positioned laterally relative to the base shelf 12 when the rails 52 are inserted into the receivers 56. Each of the receivers 56 may be positioned to extend along one of the first longitudinal side 60 and the second longitudinal side 62 of the base frame 12 such that the receivers 56 are positioned even with or above a bottommost surface of the base shelf 12 so as to not interfere with positioning of the base shelf 12 flatly on a ground surface. The auxiliary shelf 50 may also incorporate perforated screen to permit drainage or facilitate attachment of items to the auxiliary shelf using cord, line, rope, hooks, or the like.

A flange 68 may be coupled to and extending from the auxiliary shelf 50 outwardly and downwardly from the end side 54 of the auxiliary shelf 50 such that the flange 68 facilitates alignment of the auxiliary shelf 50 with the base shelf 12 when the auxiliary shelf 50 is moved into abutment with the base shelf 12.

In use, the base shelf 12 is coupled to the hand cart 20 by insertion of the tow plate 18 into the slot 14. The base shelf 12 is secured to the hand cart using the tether 36 as described above. The base shelf 12 may be provided separately as an attachment to an existing hand cart 20 or specifically designed and provided as an accessory with the hand cart 20. The auxiliary shelves 50 on each side of the base shelf 12 may be removed and the base shelf 12 provided with a width allowing the base shelf 12 to pass through a standard sized doorway without being removed from the hand cart 20. The device 10 provides for uses in various locations for various purposes including but not limited to offshore drilling environments, farming, household uses, and other places where enhanced carrying capacity for a hand cart which may still be passed through standard sized or tight doorways.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tow plate shelf device comprising:
   a base shelf; and
   a slot extending into a first longitudinal side of said base shelf wherein said base shelf is configured for coupling to a tow plate of a hand cart by insertion of the tow plate into said slot;
   an auxiliary shelf;
   a pair of rails coupled to and extending from said auxiliary shelf; and
   a pair of receivers coupled to and extending into said base shelf, each of said rails being insertable into an associated one of said receivers wherein said auxiliary shelf is coupled to said base shelf.

2. The device of claim 1, wherein said base shelf comprises:
   a base frame having a pair of end edges, a first longitudinal edge, and a second longitudinal edge, said slot extending into said first longitudinal edge of said base frame; and
   a deck coupled to said base frame, said deck being coextensive with said base frame.

3. The device of claim 1, further comprising a tether having a first end coupled to said base shelf, said tether being extendable from said first longitudinal side of said base shelf, said tether being securable to said base shelf forming a loop such that said tether is configured for positioning said loop around an upright of the hand cart wherein said base shelf is inhibited from sliding off of the tow plate of the hand cart.

4. The device of claim 3, further comprising:
   said tether having a looped end; and
   a hook coupled to said base shelf, said looped end being engageable to said hook wherein said tether forms said loop when said looped end receives said hook therethrough.

5. The device of claim 1, further comprising each of said rails extending outwardly from an end side of said auxiliary shelf, each of said receivers extending inwardly relative to an end side of said base shelf wherein said auxiliary shelf is positioned laterally relative to said base shelf when said rails are inserted into said receivers.

6. A tow plate shelf device comprising:
   a base shelf;
   a slot extending into a first longitudinal side of said base shelf wherein said base shelf is configured for coupling to a tow plate of a hand cart by insertion of the tow plate into said slot;
   wherein said base shelf comprises
   a base frame having a pair of end edges, a first longitudinal edge, and a second longitudinal edge, said slot extending into said first longitudinal edge of said base frame, and
   a deck coupled to said base frame, said deck being coextensive with said base frame; and
   said base frame extending upwardly relative to an upper surface of said deck wherein said frame defines a lip extending around said deck.

7. The device of claim 2 further comprising a medial section of said deck being solid.

8. The device of claim 7, further comprising outer sections of said deck each being a respective perforated screen.

9. The device of claim 5, further comprising a flange coupled to and extending from said auxiliary shelf outwardly and downwardly from said end side of said auxiliary shelf such that said flange facilitates alignment of said auxiliary shelf with said base shelf when said auxiliary shelf is moved into abutment with said base shelf.

10. A tow plate shelf device comprising:
    a base shelf;
    a slot extending into a first longitudinal side of said base shelf wherein said base shelf is configured for coupling to a tow plate of a hand cart by insertion of the tow plate into said slot;
    a base frame having a pair of end edges, a first longitudinal edge, and a second longitudinal edge, said slot extending through said first longitudinal edge of said base frame;
    a deck coupled to said base frame, said deck being coextensive with said base frame, said frame extending upwardly relative to an upper surface of said deck wherein said frame defines a lip extending around said deck, a medial section of said deck being solid, outer sections of said deck each being a respective perforated screen;
    a tether having a first end coupled to said base shelf, said tether being extendable from said first longitudinal side of said base shelf, said tether being securable to said base shelf forming a loop such that said tether is configured for positioning said loop around an upright of the hand cart wherein said base shelf is inhibited from sliding off of the tow plate of the hand cart, said tether having a looped end, said tether being a chain;
    a hook coupled to said base shelf, said looped end being engageable to said hook wherein said tether forms said loop when said looped end receives said hook therethrough;
    an auxiliary shelf;
    a pair of rails coupled to and extending from said auxiliary shelf, each of said rails extending outwardly from an end side of said auxiliary shelf;
    a pair of receivers coupled to and extending into said base shelf, each of said rails being insertable into an associated one of said receivers wherein said auxiliary shelf is coupled to said base shelf, each of said receivers extending inwardly relative to an end side of said base shelf wherein said auxiliary shelf is positioned laterally relative to said base shelf when said rails are inserted into said receivers; and
    a flange coupled to and extending from said auxiliary shelf outwardly and downwardly from said end side of said auxiliary shelf such that said flange facilitates alignment of said auxiliary shelf with said base shelf when said auxiliary shelf is moved into abutment with said base shelf.

* * * * *